Nov. 24, 1931. C. S. OLSON 1,833,851
CONDIMENT SHAKER
Filed May 6, 1930
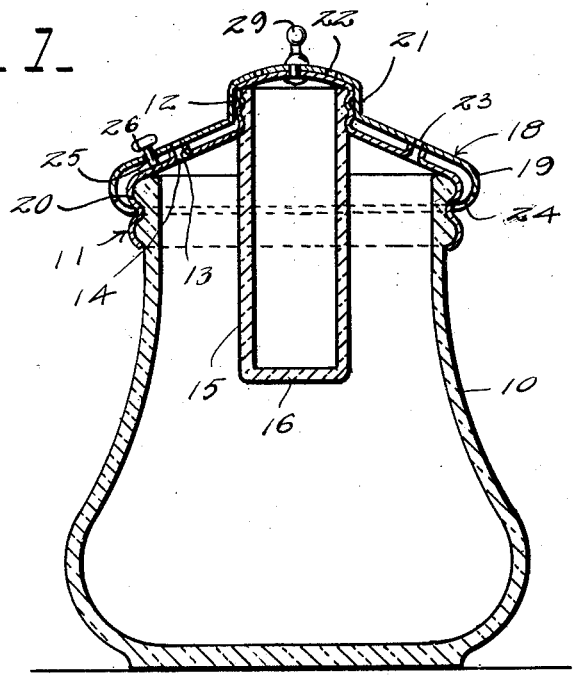
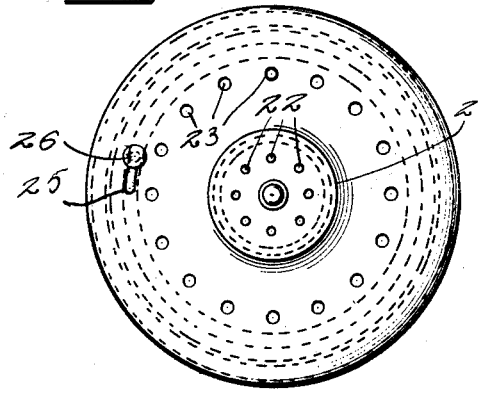
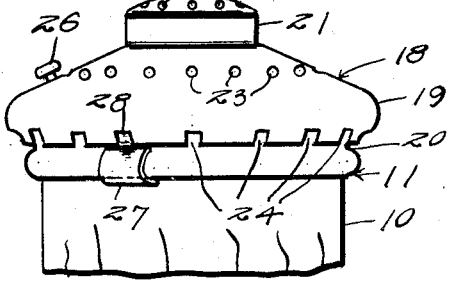
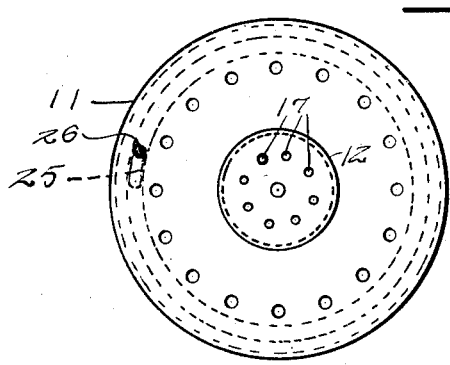
Inventor
C. S. Olson
By Watson E. Coleman
Attorney Patented Nov. 24, 1931

1,833,851

UNITED STATES PATENT OFFICE

CHARLES S. OLSON, OF DULUTH, MINNESOTA

CONDIMENT SHAKER

Application filed May 6, 1930. Serial No. 450,248.

The present invention relates to condiment receptacles and more particularly to a condiment receptacle or cruet which is adapted to contain a plurality of condiments which may be selectively removed from the receptacle.

An object of this invention is to provide a shaker cruet or the like which is so constructed as to receive several condiments which may be held within the body of the cruet or shaker in such a manner that they will not mix with each other and at the same time the condiments may be readily removed from the shaker.

Another object of this invention is to provide a shaker of the character described with a rotatable cover which is provided with suitable apertures therein so that the condiments within the several compartments of the receptacle may be selectively removed therefrom, and the apertures in the cover are so positioned as to permit closing of the apertures in the several compartments so that none of the condiments will accidentally be spilled or shaken from the cruet.

The above and various other objects and advantages of this invention will in part be described in and in part be understood from the following detailed description of the present preferred embodiment, the same being illustrated in the accompanying drawings wherein:—

Figure 1 is a vertical sectional view of a device constructed according to the preferred embodiment of this invention;

Figure 2 is a top plan view of the device;

Figure 3 is a fragmentary side elevation of the upper portion of the device; and Figure 4 is a top plan view of the cap members.

Referring to the drawings wherein like numerals of reference designate corresponding parts throughout the several views, the numeral 10 designates an outer receptacle or shaker which may be of any desired configuration and may be constructed of either metal or transparent material such as glass or the like, the body of shaker member 10 being provided with a threaded cover 11, the cover 11 having a frustro conical upper end portion which terminates in an upstanding cylindrical portion 12. The cover 10 is provided with a plurality of upstanding cone shaped portions 13 which are provided with suitable apertures 14 which are suitably spaced about the periphery of the conical member 11 so as to permit removal of the contents of the outer shaker member 10.

An inner receptacle or shaker member 15 of suitable configuration is dependingly mounted in the outer member 10, being threadably positioned in the outstanding portion 12 of the inner cover member 11, the inner receptacle 15 having a closed bottom portion 16 so as to prevent mixing of the contents of the inner receptacle with the contents of the outer receptacle.

The inner cover or cap 11 is provided at the upper end portion thereof with a plurality of apertures 17 therethrough so as to permit the contents of the inner receptacle 15 to be readily removed therefrom.

An outer rotatable cap or closure member 18 is positioned upon the inner cap 11, being rotatably secured thereto by means of crimping the periphery 19 thereof about an annular beading 20 on the inner member 11. The outer cap 18 is so constructed as to follow the general outline of the inner cap 11, being of substantially frusto conical construction and having an upstanding cylindrical portion 21 adjacent the apex thereof, the cylindrical portion 21 having a plurality of apertures 22 in the top thereof which are adapted to selectively register with complementary openings 17 in the inner cap 11. The conical surface of the outer cap member 18 is also provided with a plurality of apertures 23 therethrough which are adapted to selectively register with the apertures 14 in the conical projections 13 of the inner cap member 11.

The outer cap 18 is also provided at the lower edge portion thereof with a plurality of spaced notches or recesses 24 so that any of the condiments from the inner and outer receptacles which may accidentally fall into the space between the inner and the outer cap members may be drained or shaken out through the recesses 24 adjacent the bottom of the outer cap member 18. The inner cap 18 is also provided with an upstanding lug 25 which is adapted to project outwardly through a segmental slot 26 in the outer cover 18 so that the rotation of the outer cover 18 may be limited.

If desired, the outer cover may be provided with an inwardly extending pressed in portion which is adapted to slidably engage a complementary pressed in channel formed in the inner cap member 11 so that the movement or rotation of the outer cap 18 may be limited and if desired the cap 18 may be rotated so as to move the apertures 22 and 23 out of register with complementary apertures in the inner cap so that none of the contents of the inner and outer receptacles may be removed therefrom.

In this manner the cruet may be packed in a suitable lunch box or the like and the contents will be prevented from sifting out until the outer cap has been rotated so as to move the apertures into register with selected apertures in the inner cap.

In the operation of this device, the inner cap may be threaded off of the upper end portion of the outer receptacle 10, and the desired quantity of material, as salt, may be placed in the outer receptacle, and while the cap is off of the outer receptacle the inner receptacle 15 may be unthreaded from the cap 11 and the desired condiment placed therein such as pepper or the like, whereupon the inner receptacle 15 may be threaded into the inner cap 11 and the cap 11 then threadably positioned on the upper end portion of the outer receptacle 10. The shaker herein disclosed will then be available for use and the outer cap or closure member 18 may be rotated or swung upon the inner cap 11 so as to move the apertures 23 into register with the apertures 14 thereby permitting the contents of the outer receptacle to be removed therefrom but at the same time preventing the contents of the inner receptacle from passing outwardly through the openings 17 and 22. In like manner, if it is desired to remove the contents of the inner receptacle the outer cap may again be rotated so as to move the openings 23 out register with the openings 14 and to move the openings 22 into register with the openings 17. The contents of the inner receptacle 15 may then be removed by shaking the device and the contents of the outer receptacle will be prevented from sifting through the apertures in the two caps.

If it is desired to close the inner and outer receptacles against removal of the contents thereof, the cap may be further rotated so as to move the apertures 22 out of register with the apertures 17. A resilient member 27 may be secured to the inner cap 11 on the exposed portion thereof, the spring 27 having an upstanding lug 28 which is engageable in a selected notch 24 for holding the outer cap against rotation and in a position where all of the apertures in the inner and outer caps are out of register. Where the top or outer cap 18 is not crimped over as at 19 a pivotal member 29 is mounted axially on the inner cap and protrudes outwardly through the outer cap and rotatably holds the outer cap on the inner cap.

It will be obvious from the foregoing that an exceedingly simple cruet or shaker has been disclosed wherein a plurality of condiments may be positioned in a single article or shaker and the shaker so constructed as to permit the ready and selective removal of the various contents of the component parts of the shaker.

It will, of course, be understood that various changes and modifications may be made in the details of construction and design of the above specifically described embodiment of the invention without departing from the spirit thereof, such changes and modifications being restricted only by the scope of the following claims:—

What is claimed is:—

1. A shaker cruet of the character described comprising an inner and an outer receptacle, an inner cap member adapted to threadedly engage said inner and said outer receptacle and maintain said inner receptacle in spaced relation to said outer receptacle, said inner cap member having a frustro conical surface terminating at the apex thereof in an upstanding cylindrical portion adapted to threadedly receive the inner receptacle, an outer rotatable cap member positioned on said inner cap member, said outer cap member having a crimped lower end portion, said inner cap member having a pair of annular outstanding beads providing an annular groove therebetween said outer cap loosely engaging said inner cap in said groove, said outer cap member having a plurality of spaced notches adjacent the lower edge portion thereof, a plurality of upstanding pressed out portions mounted on said inner cap member, said upstanding portions having apertures therethrough communicating with the outer receptacle, said inner cap member also having a plurality of spaced apertures in the upper end portion thereof communicating with the inner receptacle, said outer cap member having apertures therethrough adapted for register with the apertures in the inner cap, means carried by the inner cap whereby to limit the rotation of the outer cap, said notches in said outer cap constituting drains for removal of the condiment leaking out of the inner cap member and positioned between the inner and the outer cap.

2. A shaker cruet of the character described, comprising an outer receptacle, an apertured cap disposed on the upper end of said receptacle, said receptacle having a pair of outstanding beads on the upper end thereof whereby to provide an annular groove therebetween, said cap comprising an inner closure engaging the beaded upper end portion of said outer receptacle and having a threaded upper end portion, an inner receptacle threadedly mounted on said inner cap, said inner cap having a plurality of circumferentially disposed pressed out portions communicating with the interior of the outer receptacle, an outer cap member rotatably mounted on said inner cap member and engaging the outer ends of said pressed out portions, said outer cap member having a circumferentially disposed slot therethrough, a stop member mounted on said inner cap member and extending through said slot whereby to limit the rotation of said outer cap member thereon, said outer cap member having a plurality of notches in the lower end thereof constituting drains whereby to drain the material leaking out of said outer receptacle and between said inner and outer cap members, and a releasable locking member engaging said outer cap member in a selected notch thereof whereby to hold said outer cap member in open or closed position.

In testimony whereof I hereunto affix my signature.

CHARLES S. OLSON.